UNITED STATES PATENT OFFICE 2,436,181

REGENERATED CELLULOSIC PELLICLE

Charles M. Rosser, Fredericksburg, Va., assignor, by mesne assignments, to American Viscose Corporation, Wilmington, Del., a corporation of Delaware No Drawing. Application September 29, 1945, Serial No. 619,419

2 Claims. (Cl. 117—136)

This invention relates to softening agents or plasticizers for hydrophilic materials and in particular to a plasticizing or softening composition which also renders the materials containing it flame-resistant.

Heretofore, pellicles formed of hydrophilic materials such as regenerated cellulose have been plasticized with glycerin, glycols, or similar softening agents. However, such materials, because of their organic nature, have not rendered the material flame-resistant. In order to impart this property to materials, it has been necessary to include a flameproofing substance. This procedure, however, tends to nullify the effect of the plasticizing agent since the desirable flameproofing agents known heretofore have had little plasticizing effect.

Thus, for example, fireproofing agents are disclosed in United States Patents Nos. 2,305,035 and 2,286,308. However, these substances have a low hygroscopicity and a low solubility in water. Consequently, they have little or no plasticizing effect upon the hydrophilic material impregnated with them, and they have the further disadvantage of tending to crystallize out of the pellicle at low temperatures or low relative humidities when present in large quantities.

Ammonium thiocyanate has been proposed as a combined softener and flame retardant. However, this compound is very sensitive to traces of iron ions. Iron tends to form a deep red complex ion with the thiocyanate ion. Thus, iron in the small quantities present in commercial Cellophane manufacture invariably reacts with the thiocyanate, turning the sheet a light to deep pink color. Moreover, ammonia is lost from the salt when the Cellophane is passed over the drying rolls.

Now, in accordance with this invention, a combined plasticizer and fire retardant for hydrophilic materials is prepared which may be employed in place of the mixtures of plasticizing materials and fireproofing agents heretofore employed by the art. The invention contemplates impregnating a hydrophilic material with an aqueous solution of suitable concentration of guanidine thiocyanate. This compound is nonvolatile and nondiscoloring.

Guanidine thiocyanate may be produced by various methods. Ammonium thiocyanate may be heated at 180° to 190° C. for a sufficient time to convert it into guanidine thiocyanate. This may require from twenty to twenty-five hours. Thiourea added to the reaction mixture improves the ultimate yield since thiourea is an intermediate product in the reaction. During heating, the molten mass may be agitated and a current of ammonia gas passed through it. The reaction proceeds according to the following equation:

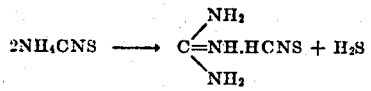

The salt may also be prepared by treating guanidine with thiocyanic acid.

A simple method of preparation adapted to be used commercially when the material is to be employed directly as an impregnating agent for hydrophilic materials includes dissolving equivalent amounts of ammonium thiocyanate and guanidine carbonate in water to yield a solution of approximately 6 per cent guanidine thiocyanate (calculated). This solution is used as the impregnating bath for the hydrophilic material. When the impregnated hydrophilic material is passed over the drying rolls, the ammonium carbonate formed is decomposed, ammonia and carbon dioxide gases being liberated and the guanidine thiocyanate remaining as the sole salt in the hydrophilic material.

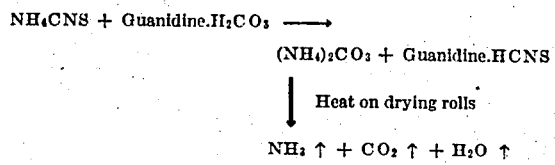

Guanidine thiocyanate is a hygroscopic salt crystallizing in large plates with a melting point of 118° C. The preparation of guanidine thiocyanate and its use as a softening and flame-retarding agent for hydrophilic materials are illustrated in the following examples:

Example I

A sheet or film of gel regenerated cellulose, whose final dry thickness would be about 0.0009 inch, was immersed or drawn through an aqueous bath containing ammonium thiocyanate and guanidine carbonate (guanidine thiocyanate) in such concentration that the final dry regenerated cellulose film contained about 8 per cent moisture and 17 per cent guanidine thiocyanate by weight. The sheet or film was allowed to pass in contact with the bath until thoroughly impregnated. It was then removed, the excess liquid being removed by suitable squeeze rolls, and the film was then dried in the usual manner, decomposing the ammonium carbonate.

A match was touched to a small portion of the sheet so prepared. The sheet ignited, but when the match was removed, the flame quickly died out. A sheet of glycerol-impregnated regenerated cellulose was tested in the same way. The sheet burned with a larger flame than the match and continued burning at an accelerated pace when the match was removed. A sheet of regenerated cellulose which had been impregnated with glycerol and diethanolamine guanidine phosphate (alkylolamine guanidine phosphate) was tested in the same manner. The flame went out after removing the match in approximately the same time as in the case of the guanidine thiocyanate-impregnated material.

Example II

A tube of regenerated cellulose was treated as in Example I with the exception that sufficient guanidine thiocyanate was used to give approximately 14 per cent by weight in the final product. The softening effect was found to be approximately equivalent to that of glycerol, while the material was definitely flame-retardant.

Example III

An impregnating bath was prepared containing approximately 1 part of calcium chloride to 4 parts of guanidine thiocyanate. The total salt concentration in the bath was 7½ per cent by weight. A sheet of regenerated cellulose was then passed through the bath, allowing it to remain in the bath for approximately 1½ minutes. The sheet was then passed over heated rolls which dried the sheet to a 20 per cent salt concentration by weight. The finished sheet was found to be well plasticized and to have good flame-retarding properties. The salts showed no tendency to crystallize out of the Cellophane, while there was no discoloration whatsoever.

Example IV

Impregnating baths were prepared containing 1 per cent, 3.5 per cent, 5 per cent, 7½ per cent, and 9 per cent of guanidine thiocyanate (calculated—equivalent quantities of ammonium thiocyanate and guanidine carbonate were employed). Several sheets of regenerated cellulose film which when dried would form No. 300 weight Cellophane (0.00085 inch thick, weight 30.57 grams per square meter) were passed through these baths and dried in the usual manner. Ammonia and carbon dioxide gas were liberated over the drying rolls, together with a certain amount of water, increasing the concentration of the guanidine thiocyanate in each sheet to an amount approximately 3 times greater than that of the bath. Each of the sheets was found to be well plasticized, the plasticizing effect increasing with the amount of guanidine thiocyanate present. The flame resistance of the sheets was noticeably better than that of glycerol-impregnated sheets. It was approximately equivalent to that of alkylolamine guanidine phosphate and alkyl guanidine phosphate impregnated sheets, but these sheets were not plasticized by the salt they contained. The sheets plasticized with guanidine thiocyanate showed no tendency to lose plasticizer by crystallization at 0° C., while the alkylolamine guanidine phosphate and alkyl guanidine phosphate sheets did show some crystallization of the impregnating salt.

Example V

An article finished with an alkali-soluble water-insoluble cellulose ether was passed through an aqueous bath containing sufficient guanidine thiocyanate (calculated-equivalent quantities of ammonium thiocyanate and guanidine were employed) to give 25 per cent by weight of the salt in the final product. The article was noticeably plasticized and its flame resistance considerably improved over the untreated article.

Example VI

A self-supporting sheet of alkali-soluble water-insoluble cellulose ether was impregnated as described in Example IV. The sheet so treated was soft and flexible, having a high degree of flame resistance.

Example VII

Casein threads, sheets, and tubes were impregnated with guanidine thiocyanate according to the procedure set forth in Example IV. The impregnated articles were flexible, soft, and markedly flame retardant.

As illustrated in the examples, impregnation of the hydrophilic material to be treated is generally obtained by passing the material through a bath containing either guanidine thiocyanate or compounds which react easily and quickly to form that salt. The article is allowed to remain in the bath for a sufficient time to completely impregnate it. It is then passed through squeeze rolls which remove excess composition and dried to the desired moisture content.

In general, aqueous solutions of guanidine thiocyanate are employed. However, organic solvents for guanidine thiocyanate may also be employed where they are miscible with the hydrophilic material. Such solvents are usually characterized by complete miscibility with water.

The concentration of the impregnating bath should be so adjusted that the guanidine thiocyanate actually present (or calculated) comprises from 1.5 per cent to 9 per cent by weight. Such a bath is suitable for impregnating Cellophane of No. 300 weight (0.0085 inch thick, 30.57 grams per square meter). For plasticizing thicker or thinner Cellophane, the concentration is adjusted in accordance with the need. Similarly, the concentration is adjusted according to the material being plasticized.

The regenerated cellulose pellicle is impregnated in the wet gel state. Thus, it is in a highly swollen hydrated state and may be associated with as much as 300 per cent or more of water. It is apparent that the removal of this water during the drying operation will concentrate the softening agent present in the bath so that its concentration will be higher in the dried article than in the bath. Thus, if a regenerated cellulose pellicle containing about 15 to 20 per cent total softener is desired as a final product, the concentration of softener in the treating bath will be adjusted to approximately one-third that value or about 5 to 7½ per cent.

Sufficient guanidine thiocyanate should be employed to give between 8 per cent and 25 per cent by weight in the impregnated sheet or article. In these quantities the salt imparts good softening and fire-retarding properties. The total amount of softener finally obtained in the impregnated film is controlled primarily by the amount of softening agent in the treating bath, the thickness of the film, the rate of passage through the bath, and the temperature of the bath.

The combined plasticizer and fire-retarding agent may also be employed in admixture with other hygroscopic liquids and salts. Such salts must be carefully chosen in order to prevent formation through hydrolysis of a guanidine salt which is insoluble in the bath solvent or impregnated hydrophilic material. Salts which have been found satisfactory include:

| | |
|---|---|
| Lithium acetate | Urea malate |
| Potassium acetate | Propylamine acetate |
| Lithium citrate | Ethylene glycol |
| Potassium lactate | Diethylene glycol |
| Sodium lactate | Sorbitol |
| Potassium propionate | Lithium acetyl salicylate |
| Lithium salicylate | Mono - triethanolamine malate |
| Glycerin | |
| Amylamine formate | |

Di(triethanolamine) monohydrogen phosphate
Di(monoethanolamine) monohydrogen phosphate
Di(amino propandiol 2,3) monohydrogen phosphate It will be appreciated that reduction in the amount of guanidine thiocyanate employed by including other plasticizers will reduce the flame-retarding properties of the impregnated hydrophilic material. Consequently, under these circumstances additional flame retardants may be added. These include formamide, alkyl guanidine phosphates, and alkylolamine guanidine phosphates.

Guanidine thiocyanate exerts both a softening and a fire-retarding reaction upon materials impregnated with it. This avoids the necessity of employing a mixture of materials which is both inefficient and time consuming, requiring as it does careful mixing and formulation of the ingredients required. Guanidine thiocyanate does not impair the transparency of the impregnated material, nor does it discolor it. In general, an article impregnated with guanidine thiocyanate will flame only when an independent flame or incandescent body is placed in contact with it. When ignition has been brought about and the flame is removed to a distance flaming and charring of the article halts almost immediately. The article cannot, therefore, propagate flame.

Guanidine thiocyanate may be employed to plasticize and impart fire retardance to hydrophilic colloids as a class in the form of pellicles, filaments, tubes, bands, or capsules. For example, the composition may be used to plasticize regenerated cellulose, gelatine, casein, hydrophilic cellulose ethers as a class, such, for example, as alkyl cellulose ethers, hydroxy-alkyl cellulose ethers, carboxy-alkyl cellulose ethers, hydrophilic mixed cellulose ethers, water-swelling cellulose esters as a class, water-swelling synthetic resins as a class, leather, glassine paper, and the like.

Having described my invention, what I claim as new and desire to secure by Letters Patent is:

1. As an article of manufacture, a regenerated cellulosic pellicle impregnated with an aqueous solution comprising guanidine thiocyanate, said solution being present in a sufficient amount to plasticize said material and render it fire retardant.

2. A regenerated cellulosic pellicle containing as a plasticizer and fire retardant guanidine thiocyanate.

CHARLES M. ROSSER.

REFERENCES CITED

The following references are of record in the file of this patent:

UNITED STATES PATENTS

| Number | Name | Date |
|---|---|---|
| 2,305,035 | Rosser | Dec. 15, 1942 |
| 2,286,308 | Rosser | June 16, 1942 |
| 1,780,636 | Stine | Nov. 4, 1930 |
| 2,019,872 | Prochnow | Nov. 5, 1935 |

FOREIGN PATENTS

| Number | Country | Date |
|---|---|---|
| 379,580 | Great Britain | Sept. 1, 1932 |
| 690,746 | Great Britain | May 6, 1940 |

OTHER REFERENCES

Lange Handbook of Chemistry, 5th ed., pages 498–499 (Handbook Publishers Inc., Sandusky, Ohio 1944).